[19] United States Patent
Waltermann et al.

(10) Patent No.: US 7,490,245 B2
(45) Date of Patent: *Feb. 10, 2009

(54) SYSTEM AND METHOD FOR DATA PROCESSING SYSTEM PLANAR AUTHENTICATION

(75) Inventors: Rod David Waltermann, Durham, NC (US); Michael Douglas Anderson, Raleigh, NC (US); Ernest Nelson Mandese, Durham, NC (US); Kerry Graham Sanders, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 707 days.

This patent is subject to a terminal disclaimer.

(21) Appl. No.: 10/898,822

(22) Filed: Jul. 24, 2004

(65) Prior Publication Data
US 2006/0020821 A1    Jan. 26, 2006

(51) Int. Cl.
*H04L 9/32* (2006.01)
(52) U.S. Cl. ..................................... 713/189
(58) Field of Classification Search ................. 713/189
See application file for complete search history.

(56) References Cited

U.S. PATENT DOCUMENTS

| | | | | |
|---|---|---|---|---|
| 5,450,489 A | * | 9/1995 | Ostrover et al. | 705/51 |
| 5,940,509 A | * | 8/1999 | Jovanovich et al. | 713/191 |
| 6,367,011 B1 | * | 4/2002 | Lee et al. | 713/172 |
| 6,823,464 B2 | * | 11/2004 | Cromer et al. | 726/5 |
| 6,928,541 B2 | * | 8/2005 | Sekiguchi | 713/2 |
| 2003/0041254 A1 | * | 2/2003 | Challener et al. | 713/193 |
| 2003/0056107 A1 | * | 3/2003 | Cammack et al. | 713/189 |
| 2003/0120923 A1 | * | 6/2003 | Gilman et al. | 713/170 |
| 2004/0162989 A1 | * | 8/2004 | Kirovski | 713/189 |
| 2004/0259633 A1 | * | 12/2004 | Gentles et al. | 463/29 |
| 2005/0010767 A1 | * | 1/2005 | Craft | 713/168 |
| 2005/0010788 A1 | * | 1/2005 | Craft | 713/187 |

\* cited by examiner

*Primary Examiner*—Kambiz Zand
*Assistant Examiner*—Teshome Hailu
(74) *Attorney, Agent, or Firm*—Scott W. Reid; Dillon & Yudell LLP

(57) ABSTRACT

Initially, a hardware inventory device is provided within the data processing system. UIC that uniquely identifies the data processing system is stored in a non-erasable memory of the hardware inventory device. An encrypted hash generated by combining the UIC and a BIOS hash is stored in the non-erasable memory of the hardware inventory device. In response to a loading of a software program previously installed within a direct access storage device of the data processing system, the following steps are performed: i. the encrypted hash is obtained from the non-erasable memory of the hardware inventory device; ii. the encrypted hash is decrypted; iii. a new hash is generated by using the UIC and a BIOS from the data processing system, and the decrypted hash is compared with the new hash; and iv. the software program loading is allowed to continue when the decrypted hash matches the new hash.

8 Claims, 9 Drawing Sheets

SYSTEM AND METHOD FOR DATA PROCESSING SYSTEM PLANAR AUTHENTICATION

CROSS-REFERENCE TO RELATED APPLICATIONS

The present application is related to co-pending U.S. patent application Ser. No. 10/898,823, titled "SYSTEM AND METHOD FOR SOFTWARE LOAD AUTHENTICATION," filed concurrently herewith, and is incorporated herein by reference in its entirety.

BACKGROUND OF THE INVENTION

1. Technical Field

The present invention relates generally to security mechanisms for computer systems and software, and in particular, to a system and method for preventing unauthorized installation and use of proprietary software on unauthorized systems. More particularly, the present invention relates to employing a BIOS signature verification technique to reliably authenticate a computer system as an authorized platform for an operating system or other computer program during a software installation or system startup process. The present invention further relates to a system and method for using an identifier code stored in non-erasable memory within a hardware inventory device to authenticate a data processing system planar.

2. Description of the Related Art

Computer software is unique as a commercial product in that a legitimately purchased copy can be almost effortlessly replicated and passed to innumerable non-licensed purchasers. This ease of replication-and-transfer characteristic of computer software is beneficial in terms of lowering manufacturing costs and facilitating widespread distribution. For example, a software manufacturer may distribute one physical copy of a software product and sell a multi-seat license that legally empowers the purchaser to efficiently install the software product on many different computers. Unfortunately, the ease of replication and transferability comes at a cost of widespread commercial abuses associated with the aforementioned illegitimate transfers such as software piracy.

Given the urgency felt by companies involved in the design, production and sale of computer software to reduce the prevalence of such practices, several techniques have been developed to help curtail unauthorized installation of software products. One such technique, implemented by the object software product itself or an associated installation application, utilizes a recognition function to prevent installation of the software on any but an authorized (i.e., recognized) hardware platform. For example, on systems in which software such as the operating system, is pre-loaded as part of the system manufacturing process, a so-called BIOS lock may be included as a security feature in end user provided recovery disks. The BIOS lock is utilized to restrict installation of the operating system software included in recovery/reinstall type applications in accordance with the BIOS content of the intended recipient system. A conventional BIOS lock mechanism entails searching the Basic Input/Output System (BIOS) of the intended platform for a specified identifier, typically an alphanumeric string. While the installer program search/recognition code is often encrypted as a security precaution, the object BIOS string is easily "read out" and therefore accessible for copy or modification by would-be hackers, particularly with the continued development of increasingly sophisticated system data access tools such as Desktop Management Interface (DMI).

Another problem relating to system fidelity verification is encountered in a common form of computer system manufacturing process in which a "system manufacturer" assembles hardware components of computer systems (e.g., motherboards, processors, memory devices, etc.), and pre-loads software applications, such as operating systems, as part of system packaging. While a BIOS locking mechanism may assist in preventing end-users from illicitly loading software onto unauthorized systems, an unscrupulous system manufacturer having legitimate possession of soft copies of the system BIOS and also the pre-load software is not prevented from producing an additional number of systems than those authorized by the vendors by simply installing the legitimate BIOS code and pre-loading the corresponding operating system software on additional system boards.

Accordingly, there remains a need for improved technology solutions to piracy and illicit use, while recognizing and accommodating the efficiencies in modularized computer production models and practices of legitimate purchasers. The present invention addresses these and other needs unaddressed by the prior art.

SUMMARY OF THE INVENTION

A system, method and program product for authenticating a software load to a data processing system that includes a stored basic input/output system (BIOS) are disclosed herein. The method of the present invention is initiated responsive to initiating an install or load transfer of computer software to or within a data processing system. The installation program includes or is provided with a public key decryption algorithm utilized during the authentication process for decrypting a digital signature in the form of a pre-stored, private key encrypted hash of the system BIOS. The installation program further includes a hash algorithm corresponding to the hash algorithm used to produce the digital signature for generating a hash of the system BIOS. The installation program then compares the decrypted BIOS hash with the generated BIOS hash to authenticate the system, which is utilized to determine whether to continue or terminate the software load or installation process.

In another aspect, a system and method are disclosed for providing a system planar specific pre-load authentication that enables a supplier of system hardware and software components to detect assembly of unauthorized systems. The method includes authenticating a data processing system having a hardware inventory device that is uniquely associated with the data processing system. First, an identifier code that uniquely identifies the data processing system and an encrypted hash of the identifier code are stored in non-erasable memory within a hardware inventory device prior to the device being mounted on a system board. After mounting the hardware inventory device on the system board, software preload is authenticated by generating a hash of the identifier code, decrypting the encrypted hash of the identifier code, and comparing the decrypted identifier code hash with the generated identifier code hash to authenticate the system. The entities providing the hardware and/or software components, maintains a record of the system specific identifier codes enabling hardware inventory control tracking by comparing the number of hardware inventory devices issued to a specified system manufacturer with the number of system boards ordered by the manufacturer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to a system, method and computer program product for authenticating the core hardware platform of a data processing system to prevent or reduce unauthorized installation and loading of software products. More specifically, the present invention is directed to improving the security of software or computer data transfer, loading, and execution processes in which it is desired to authenticate a given system platform as eligible to receive and/or load and/or execute computer data, typically in the form of an application program or operating system. The present invention is designed to facilitate software installation and network downloading processes, in particular, in a manner that maintains confidentiality of the end-user and assures authentication with a higher degree of reliability than in conventional techniques. As explained in further detail with reference to the figures, the system and method of the present invention utilize a digital signature, as a BIOS lock mechanism to achieve the foregoing objectives.

Figure 1:
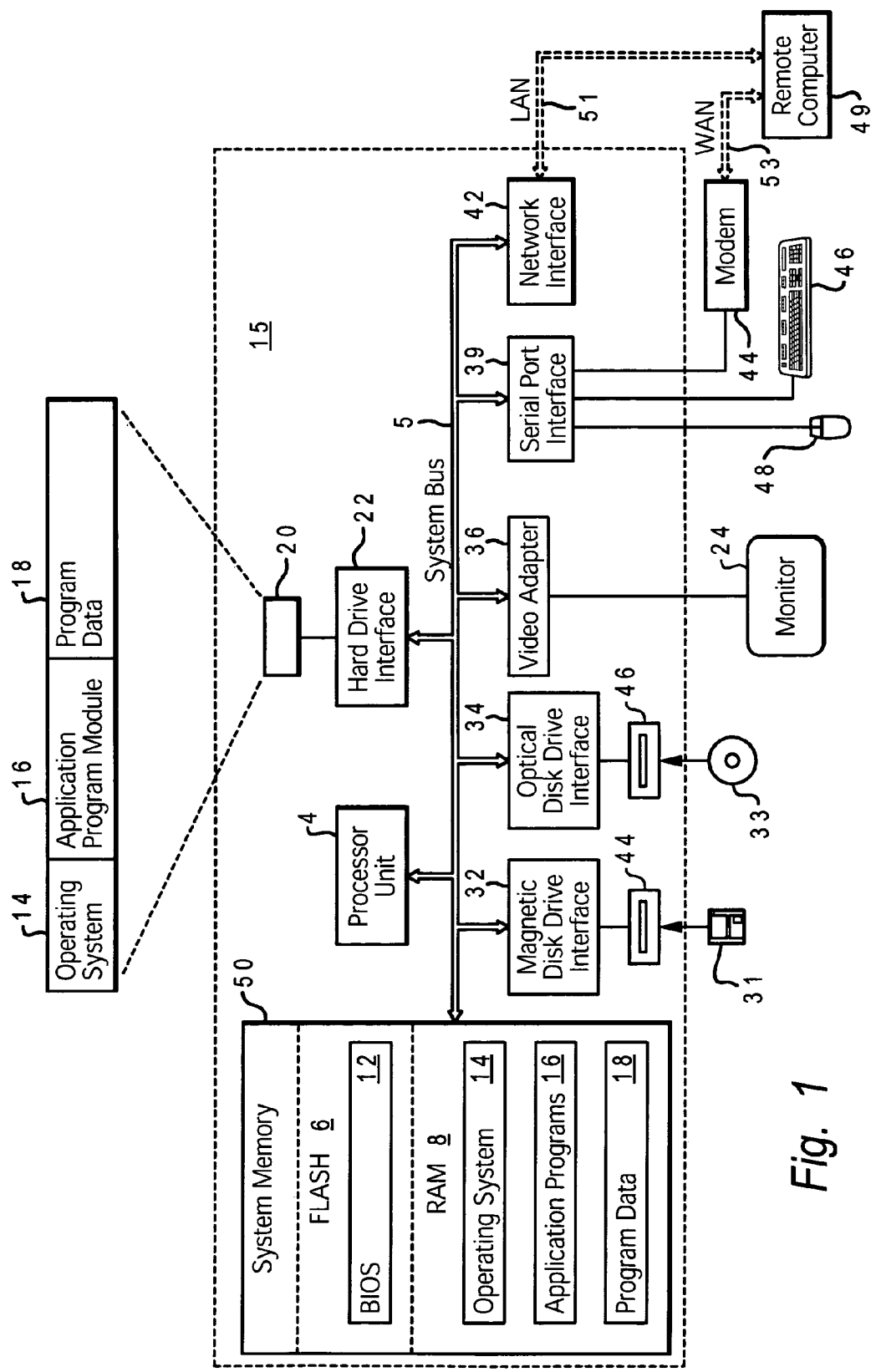
FIG. 1 depicts a data processing system that may be utilized to implement the method and system of the present invention.

With reference now to the figures, wherein like reference numerals refer to like and corresponding parts throughout, and in particular with reference to FIG. 1, there is depicted a data processing system 15 that may be utilized to implement the method and system of the present invention. For discussion purposes, the data processing system is described as having features common to a personal computer, such as a desktop or portable computer. However, as used herein, the terms "data processing system," "computer," and the like are intended to mean essentially any type of computing device or machine that is capable of receiving, storing and running a software product, including such devices as communication devices (e.g., pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the present invention. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a data processing system 15 configured as a personal computer and thus generally comprising a processing unit 4, a system memory 50, and a system bus 5 that couples system memory 50 to processing unit 4. The system memory 50 includes flash memory 6 and random access memory (RAM) 8. Flash memory 6 is an electrically erasable programmable read only memory (EEPROM) module and includes a basic input/output system (BIOS) 12, containing the basic routines that facilitate transfer of information between elements within personal computer 15, such as during start-up. Data processing system 15 further includes a hard disk drive 20, a magnetic disk drive 44, e.g., to read from or write to a removable disk 31, and an optical disk drive 46, e.g., for reading a CD-ROM disk 33 or to read from or write to other optical media. Hard disk drive 20, magnetic disk drive 44, and optical disk drive 46 are communicatively coupled to system bus 5 by a hard disk drive interface 22, a magnetic disk drive interface 32, and an optical drive interface 34, respectively. The drives and their associated computer-readable media provide nonvolatile storage for data processing system 15. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary computer operating environment.

A number of program modules may be stored in the drives and RAM 8, including an operating system 14, application program modules 16, such as Microsoft's OFFICE suite of program modules, and program data 18. A user may enter commands and information into data processing system 15 through a keyboard 46 and pointing device, such as a mouse 48. Other input devices (not shown) may include a microphone, joystick, game pad, satellite dish, scanner, or the like. These and other input devices are often connected to processing unit 4 through a serial port interface 39 that is coupled to system bus 5, but may be connected by other interfaces, such as a game port or a universal serial bus (USB). A monitor 24 or other type of display device is also connected to system bus 5 via an interface, such as a video adapter 36. In addition to the monitor, personal computers typically include other peripheral output devices (not shown), such as speakers or printers.

Data processing system 15 may operate in a networked environment using logical connections to one or more remote computers, such as a remote computer 49. The remote computer 49 may be a server, a router, a peer device or other common network node, and typically includes many or all of the elements described relative to data processing system 15. The logical connections depicted in FIG. 1 include a local area network (LAN) 51 and a wide area network (WAN) 53.

When used in a LAN networking environment, data processing system 15 is connected to LAN 51 through a network interface 42. When used in a WAN networking environment, data processing system 15 typically includes a modem 44 or other means for establishing communications over WAN 53, such as the Internet. The modem 44, which may be internal or external, is connected to system bus 5 via serial port interface 39. In a networked environment, program modules depicted relative to data processing system 15, or portions thereof, may be stored in the remote memory storage device. It will be appreciated that the network connections shown are exemplary and other means of establishing a communications link between the computers may be used.

Figure 2A:
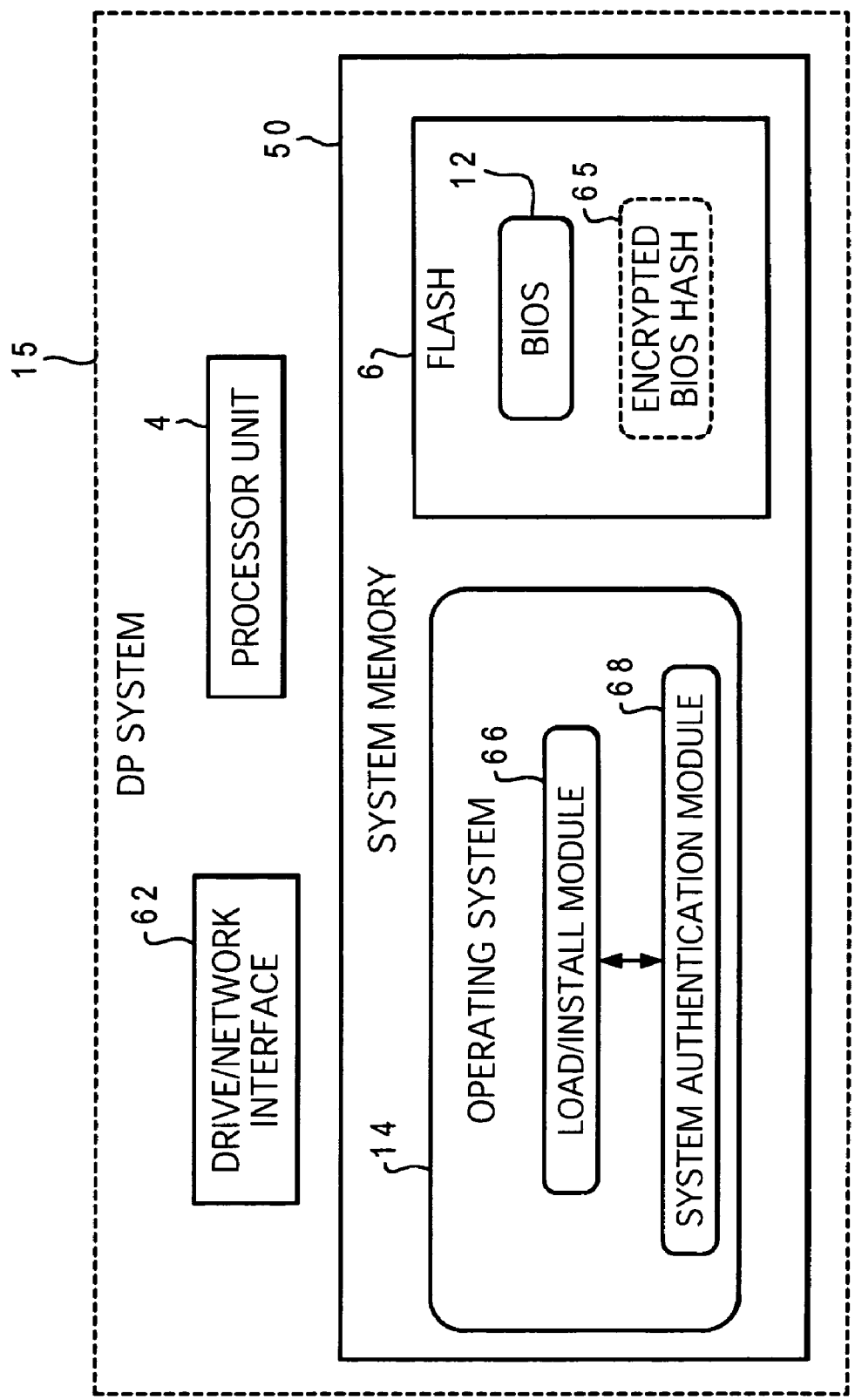
FIG. 2A is a simplified block diagram illustrating a data processing system adapted to implement software load system authentication in accordance with one embodiment of the present invention.
Figure 2B:
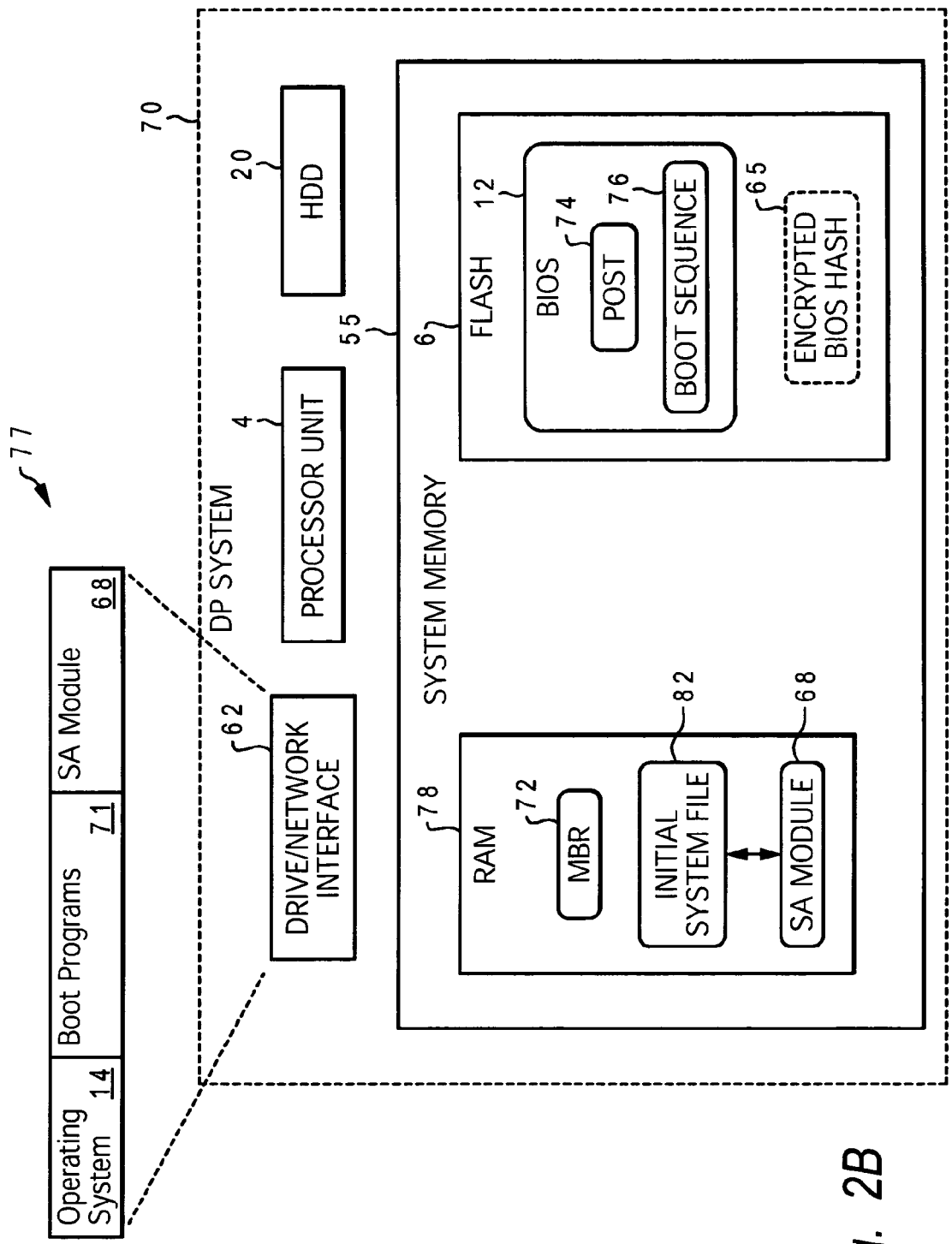
FIG. 2B is a simplified block diagram depicting a data processing system adapted to implement software load system authentication in accordance with an alternate embodiment of the present invention.

FIGS. 2A and 2B illustrate, respectively, a pair of data processing systems for implementing software load authentication in accordance with alternate embodiments of the present invention. Both embodiments include any combination of electronic devices, components and/or software modules and instructions for enabling a given computer software module, package, program, instruction, file or data (referred to collectively herein as "computer software," "software product" or similar labels) to be installed or loaded within one or more storage or memory devices within the object data processing system by means of a system authentication process performed in conjunction with a software installation or loading process. The system authentication employs a system-borne, digital signature technique to prevent installation and/or loading of a software product onto a data processing system that for whatever commercial, security or other reason is not authorized to install, load and/or execute the software product in question.

As shown in FIG. 2A, one embodiment of the software load authentication system is deployed within data processing system 15, which as explained with reference to FIG. 1, is generally configured as a personal computer. Processor unit 4 and system memory 50 are depicted as blocks within data processing system 15 which further includes a drive/network interface block 62 representing the combined functionality of the disk and CD drives and the network interface depicted in FIG. 1. Included within system memory 50 is a block 14 representing the operating system. In accordance with the depicted embodiment, a software installation utility in the form of a load/install module 66 and an associated system authentication module 68 have been loaded into system memory 50, preferably as programs or routines called or executed by operating system 14. Load/install module 66 may be, in whole or in part, a system-resident program, similar to Windows Installer, which is loaded into system memory under or in association with operating system 14. In the alternative, load/install module 66 may be, in whole or in part, a module included in a software installation package maintained on one or more optical or magnetic software installation disks containing the software to be installed/loaded onto the system or may be a network-delivered software installation package. In either case, load/install module 66 preferably includes sub-modules and instructions for facilitating the installation, loading, or other transfer of a computer software product onto the host data processing system 15.

Such software install/load facilitation typically includes many different features depending on whether it is included with and tailored to the software product to be installed, or is instead a system-resident utility. In the former case, the load/install module 66 includes instructions, routines, etc., for exploring the host system features as related to the installation (e.g., memory, operating system, file system, etc.) as well as for retrieving and strategically copying the object software product onto the system. In the latter case, the load/install module 66 may include instructions, algorithms, routines, etc., for managing software installation as well as intermittent additions and deletions of software components. In many cases, the responsibility for execution and management of software installation is shared between a software product side installation module and system side installer utility.

As part of a software loading/installation process, load/install module 66 operates in conjunction with a system authentication module 68 to perform the signature verification required to enable a given software product to be loaded or installed onto data processing system 15. In one embodiment, load/install module 66 issues a request or "challenge" via processor 4 for determining whether or not data processing system 15 is authorized to receive the software product to be loaded. System authentication module 68 responds by commencing an authentication routine in which a system-specific digital signature is verified to permit continued loading/installation.

The authentication routine, as performed by load/install module 66 in cooperation with system authentication module 68, utilizes a private key encrypted hash 65 of all or a selected portion of the system BIOS 12. As shown in the depicted embodiment, as well as in FIG. 1, BIOS 12 is typically included within the modifiable and non-volatile storage medium of flash memory device 6. In a preferred embodiment, private key encrypted hash 65, referred to herein alternately as a "digital signature," is stored (typically, during system manufacture) within the non-volatile storage of data processing system 15. Digital signature 65 is preferably stored in flash memory 6 or other updatable, non-volatile media to enable the signature to be updated such as via a network interface. As explained below with reference to FIG. 4A, the system shown in FIG. 2A may be used for software load authentication during a system "run-time" software installation process (i.e., installation/loading of software onto the system with the operating system loaded).

Figure 4A:
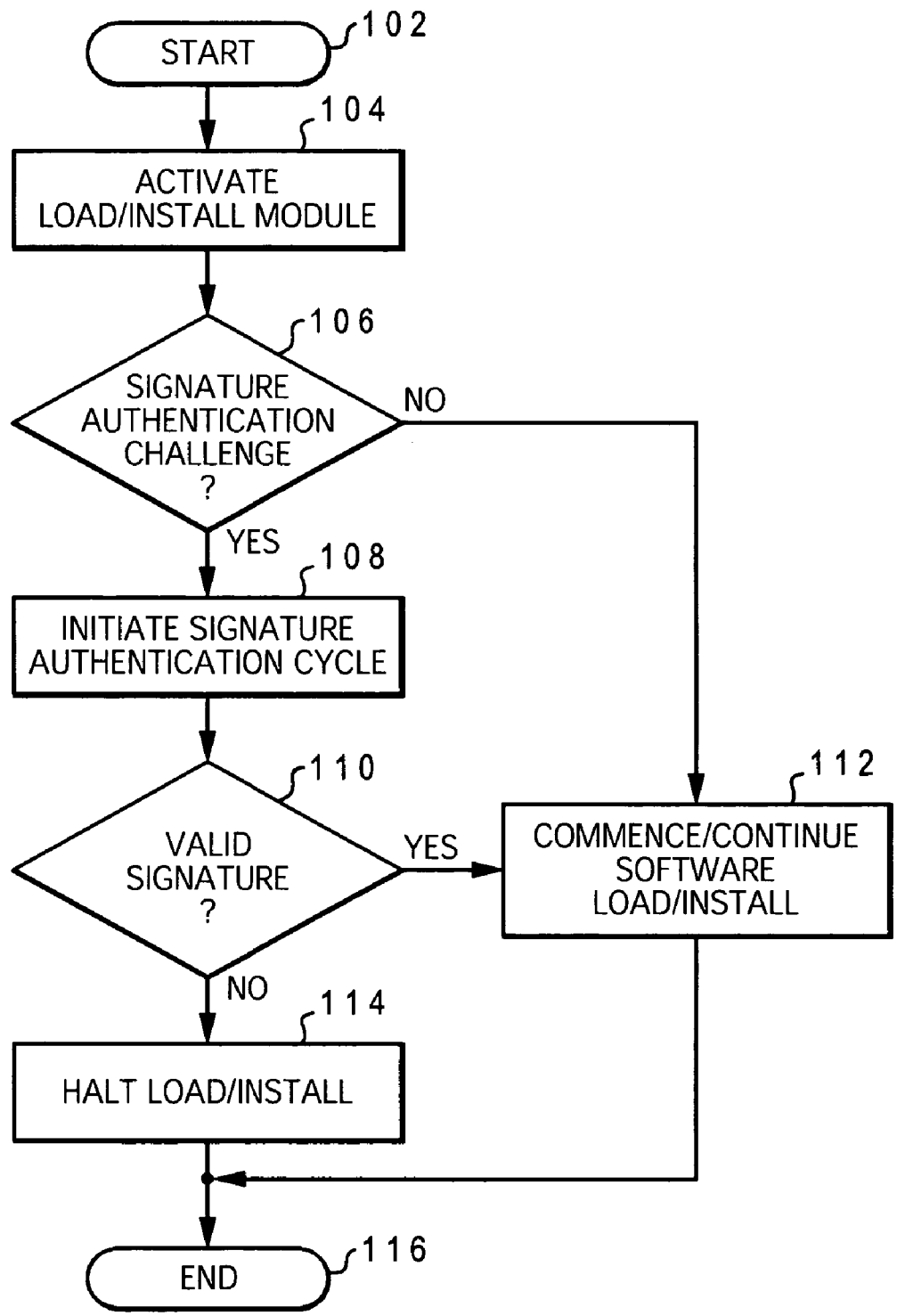
FIG. 4A is a simplified flow diagram illustrating steps performed as part of a software load system authentication process in accordance with one embodiment of the present invention.

Referring to FIG. 4A, there is depicted a simplified flow diagram illustrating steps performed as part of a software load system authentication process implemented by data processing system 15 in accordance with one embodiment of the present invention. The process begins as depicted at steps 102 and 104 with load/install module 66 being called or otherwise activated in connection with a prospective installation of a software product onto data processing system 15. Proceeding as shown at steps 106 and 112, in response to no digital signature authentication challenge or request being issued (typically issued by load/installation programs included in the software installation package), the software load/install process continues without further regard to the BIOS signature. If, however, a digital signature authentication challenge or request is detected, the system branches to system authentication module 68 which commences a signature authentication cycle as shown at steps 106 and 108. The signature authentication cycle is a process including a step of utilizing a one-way hash algorithm to generate a hash of BIOS 12. Utilizing a public key (typically provided with the software installation package) the pre-stored private key encrypted BIOS hash 65 is decrypted and the resulting decrypted hash is compared to the generated BIOS hash to authenticate the signature.

Responsive to a determination that the digital signature is valid for the to-be-installed software product, i.e., the decrypted pre-stored BIOS hash matches the generated BIOS hash, system authentication module 68 sends a load/install authorization, or a functionally equivalent message or command to load/install module 66 enabling the software load/install process to continue as shown at steps 110 and 112. Otherwise, as depicted at steps 110 and 114, if the digital signature is determined by system authentication module 68 not to be valid, the load/install process is halted and the process ends at step 116.

With reference to FIG. 2B, there is illustrated a simplified block diagram depicting a data processing system 70 adapted to implement software load system authentication in accordance with an alternate embodiment of the present invention. As explained below, the embodiment depicted in FIG. 2B is directed to software load authentication for authenticating the system BIOS in association with an operating system load or recovery install process occurring during a system startup or restart. As with data processing system 15 shown in FIG. 2A, data processing system 70 is generally configured as a personal computer generally comprising processor unit 4, a system memory 55 and drive/network interface 62 depicted as blocks. Included within system memory 55 is flash memory device 6 as well as a RAM device 78. In accordance with the depicted alternate embodiment, the system has not completed a startup boot process, and consequently operating system 14 has not been loaded into RAM memory 78. With data processing system 70 in its shutdown, or pre-booted state, operating system 14 is stored on one or more of an optical or magnetic drive included in drives/network interface block 62 or on HDD 20. Stored in association with a copy of operating system files, such as for example, on an optical disk within a CD-ROM drive within drive/network interface 62, is a set of boot programs 71 as may be found on a system recovery disk represented as block 77. Recovery disk 77 further includes a system authentication module 68. In contrast to the embodiment depicted in FIGS. 2A and 4A, wherein the software load authentication process is integral to a runtime software product installation, the software authentication mechanism depicted in FIG. 2B is designed for authenticating a system BIOS signature as part of a protected boot process that prevents the operating system from being loaded or installed without signature authentication.

Figure 4B:
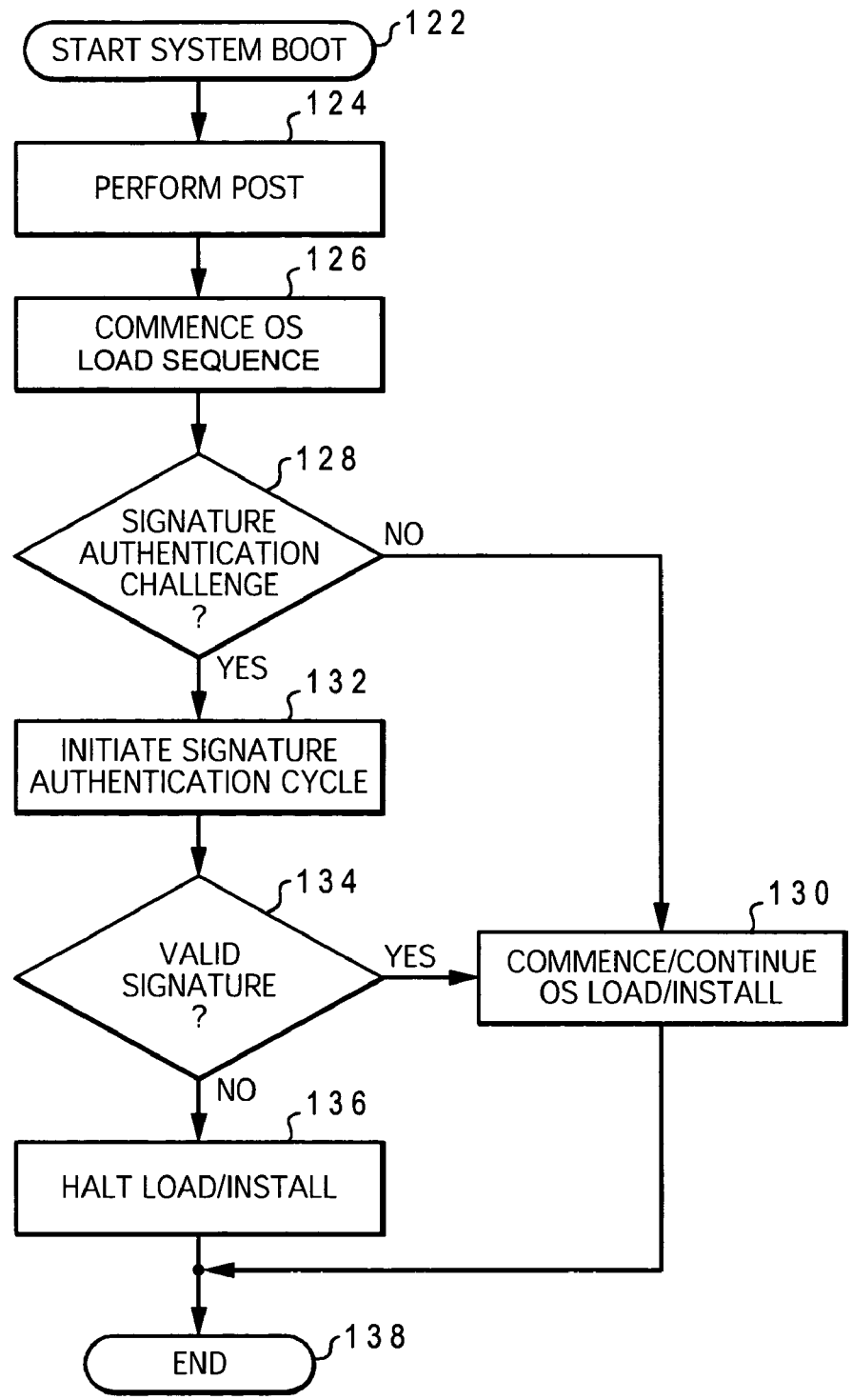
FIG. 4B is a simplified flow diagram depicting steps performed as part of a software load system authentication process in accordance with an alternate embodiment of the present invention.

A system boot process employing the software load system authentication of the present invention is now described with reference to FIG. 4B in conjunction with FIG. 2B. The boot process begins with a system start or restart prompt at step 122 and proceeds to step 124 with BIOS 12 executing a power-on self test (POST) module 74 to validate that the system components are operational. Following the POST sequence, a BIOS boot program module 76 begins a search sequence looking for boot program modules that will actually load operating system 14 into memory, such as RAM 78. Having identified the CD-ROM drive within interface 62 as the location of the operating system boot files, and in accordance with conventional boot procedure, BIOS 12 next looks to a specified sector of the disk, typically the first sector, and copies data from it into specified locations in RAM 78. In the depicted embodiment, this copy includes copying boot programs including a master boot record 72 into RAM 78. The boot record contains a program that BIOS 12 then branches to, giving the boot record 72 control of the system. Loading of operating system 14 then begins with boot record 72 loading an initial operating system file 82 (e.g., NTLDR in personal computers). Initial system file 82 preferably includes sub-modules and instructions for facilitating the installation, loading, or other transfer of operating system files onto the host data processing system 70. Initial system file 82 further includes system authentication module 68. Following the authentication procedure explained below, initial system file 82 either commences loading the rest of operating system 14 into RAM 78 or halts the loading process depending on the authentication cycle result as explained herein.

Prior to or at any point during initial system file 82 commencing the operating system load, and proceeding with the process at step 132, system authentication module 68 commences a BIOS signature authentication cycle, preferably in response to a challenge or request (step 128). Similar to the authentication described with reference to FIGS. 2A and 4A, the signature authentication performed by system authentication module 68 in cooperation with initial system file 82, or an equivalent operating system load module, fundamentally involves comparing a newly generated hash of BIOS 12 with the decrypted hash resulting from performing a public key decryption of the pre-stored, private key encrypted BIOS hash 65 and using the comparison to determine signature validity (step 134).

Responsive to a determination that the digital signature is valid for the to-be-loaded operating system 14, i.e., the decrypted pre-stored BIOS hash matches the generated BIOS hash, system authentication module 68 sends a load/install authorization message to initial system file 82, or an equivalent operating system load module, enabling the software load/install process to continue as shown at steps 130. Otherwise, as depicted at step 136, if the digital signature is determined by system authentication module 68 not to be valid, the load process is halted and the process ends at step 138.

It should be noted that while the foregoing embodiment is described in the context of a personal computer startup process, those skilled in the art will appreciate that the software load authentication system and method described herein is equally applicable to an initial program load (IPL) for a mainframe system.

Figure 3:
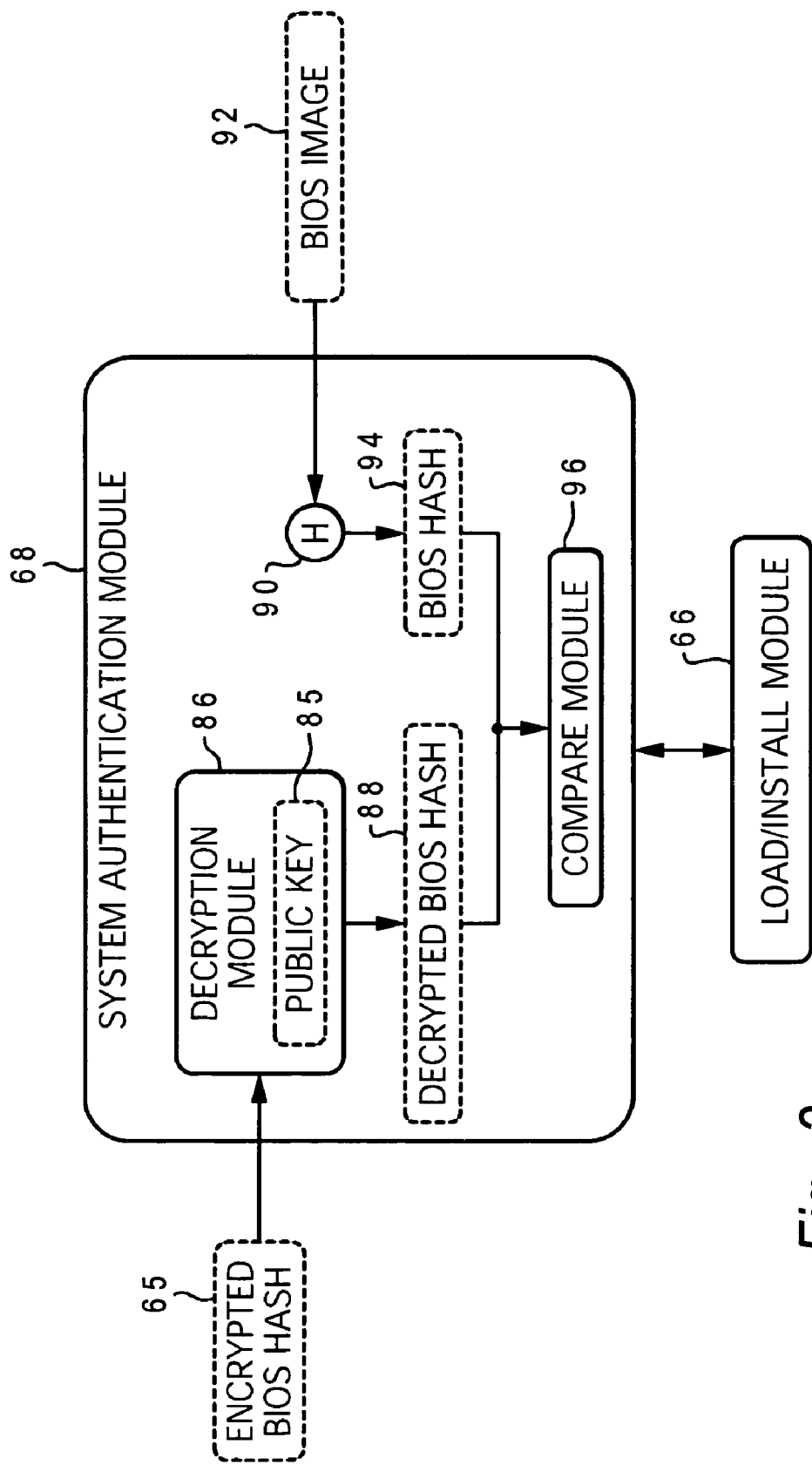
FIG. 3 is a simplified block diagram representation of a software load system authentication module in accordance with a preferred embodiment of the present invention.
Figure 5:
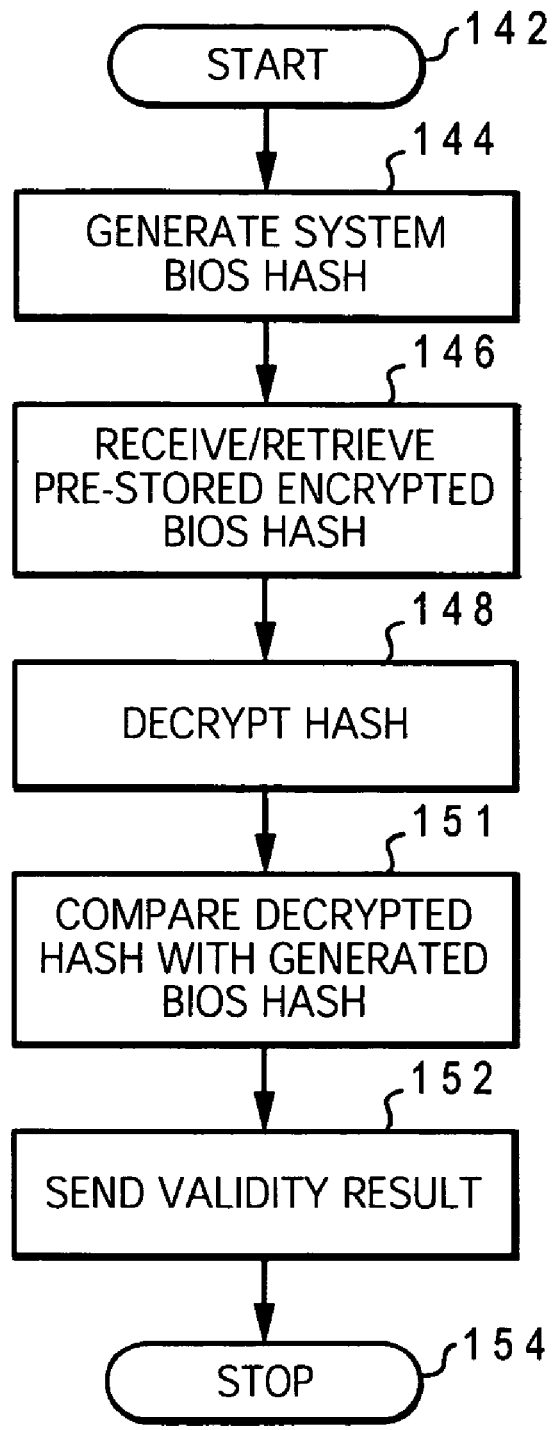
FIG. 5 is a simplified flow diagram illustrating steps performed during a software load authentication cycle in accordance with a preferred embodiment of the present invention.

FIG. 3 depicts a simplified block diagram representation of the constituent features of software load system authentication module 68 in accordance with a preferred embodiment of the present invention. As shown in FIG. 3, system authentication module 68 generally comprises a decryption module 86 and a one-way hash module 90 each logically coupled to a compare module 96. Referring to FIG. 5 in conjunction with FIG. 3, a software load authentication cycle implemented by system authentication module 68 is now described. The process begins as shown at step 142 and proceeds to step 144 with one-way hash module 90 utilizing a hashing algorithm to converts a variable-length string, such as read-out BIOS image 92 input, into a fixed-length and typically dramatically shortened BIOS hash output value 94. Associated with hash module 90 are circuit and/or program module means adapted to receive or retrieve the BIOS image string 92.

As shown at step 146, decryption module 86 receives as input the private key encrypted BIOS hash 65 that is preferably pre-stored within the object data processing system as shown in FIGS. 2A and 2B. Next, as depicted at step 148, decryption module 86 generates a decrypted BIOS hash string by applying a decryption algorithm in conjunction with a public key 85 that corresponds to the private key utilized to encrypt BIOS hash 65 in accordance with known asymmetric key encryption techniques. Public key 85 is preferably stored together with decryption module 86 in association with the software installation package (FIG. 2A embodiment) or operating system recovery package (FIG. 2B embodiment). In an alternate embodiment, public key 85 is stored within the host data processing system such as within a flash memory device.

Compare module 96 includes circuit and/or program module means for receiving and comparing decrypted BIOS hash 88 with locally generated BIOS hash 94 (step 151). The process ends as shown at steps 152 and 154 with system authentication module 68 sending a validity result message or command to the associated load/install application. Specifically, responsive to compare module 96 finding a match, system authentication module 68 delivers a load/install enable message or command to the associated load/install module 66 to commence or continue the loading process. If the decrypted BIOS hash 88 is found not to match BIOS hash 94, a load/install halt instruction or command is issued from system authentication module 68 to the associated load/install module 66.

Figure 6:
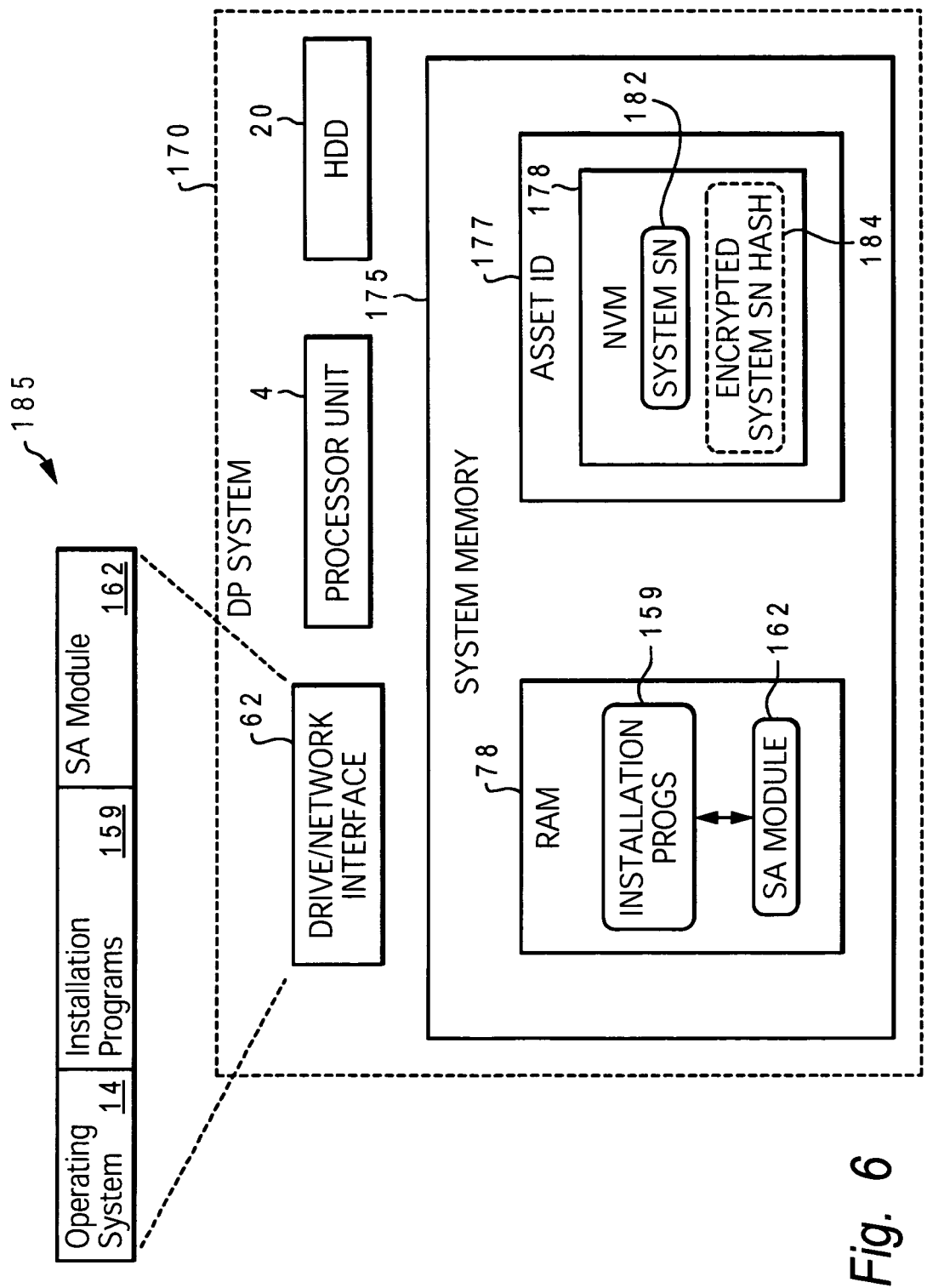
FIG. 6 is a simplified block diagram depicting a data processing system adapted to implement pre-load system authentication in accordance with an alternate embodiment of the present invention.
Figure 7:
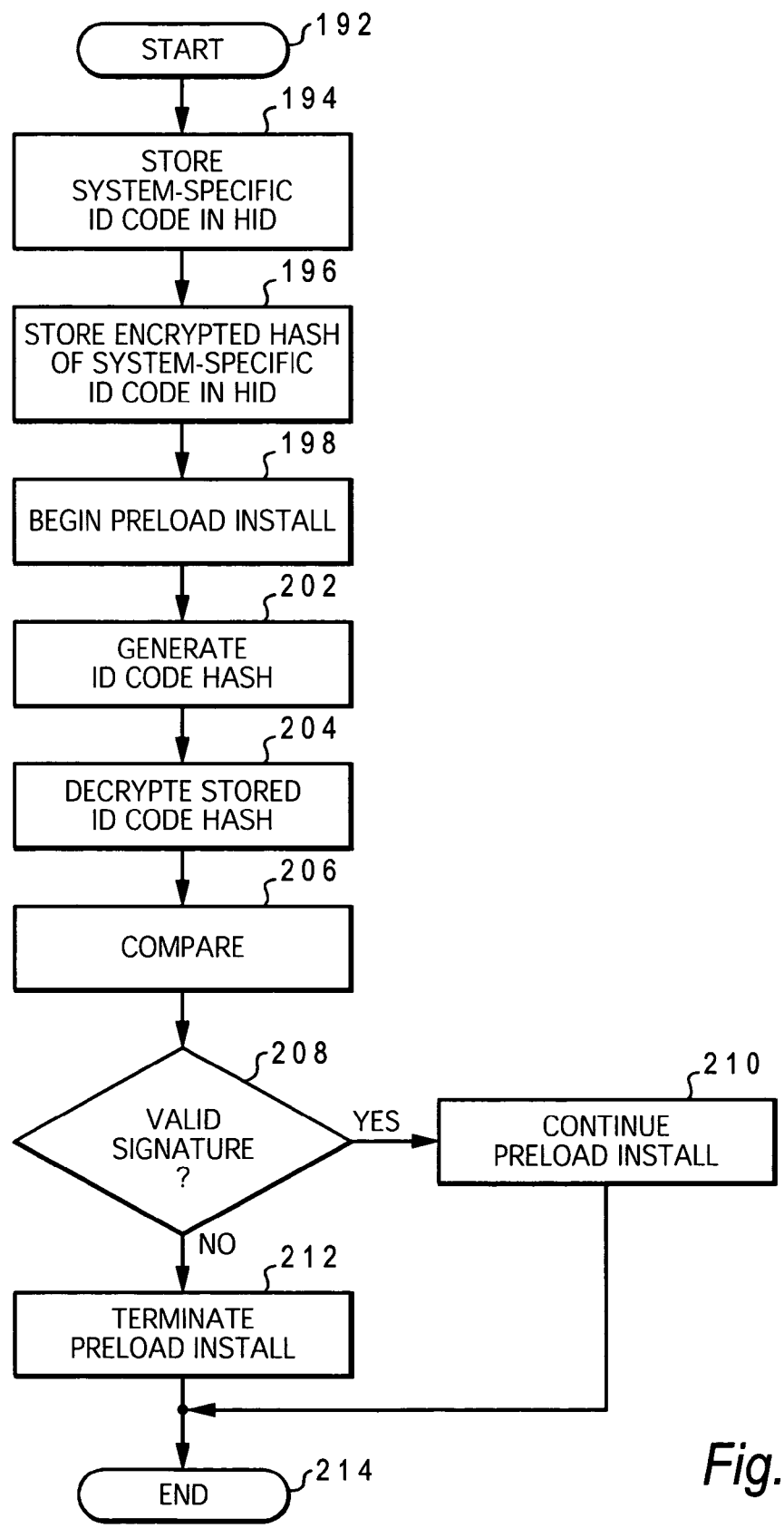
FIG. 7 is a simplified flow diagram depicting steps performed as part of a pre-load system authentication process in accordance with an alternate embodiment of the present invention.

The foregoing embodiments are directed to an improved system authentication BIOS lock mechanism for preventing loading or installation of software products onto an unauthorized data processing system. FIGS. 6 and 7 depict an alternate embodiment of the present invention that is directed toward preventing system piracy that may occur as part of software pre-loading during system manufacture. Specifically, and with reference to FIG. 6, there is illustrated a simplified block diagram depicting a data processing system 170 adapted to implement pre-load system authentication in accordance with an alternate embodiment of the present invention. As explained below, the embodiment depicted in FIG. 6 is designed for implementing software pre-load authentication for authenticating the system identity in association with an operating system pre-load installation process. As with the previously depicted embodiments, data processing system 170 is generally configured as a personal computer generally comprising processor unit 4, a system memory 175, drive/network interface 62, and hard disk drive 20 depicted as blocks. In accordance with the depicted alternate embodiment, the operating system files 14 have not been installed and, in preparation for pre-load installation, are contained on one or more pre-load installation disks 185 within drive/network interface 62. Stored in association with the operating system files 14 on pre-load installation disk 185 is a set of installation program files 159 and a system authentication module 162, which as explained in further detail below, is utilized for validating a system-specific identifier that is pre-stored in non-volatile and non-erasable memory within the system.

As shown in the depicted embodiment, data processing system 170 further includes an asset ID chip 177 forming a part of the hardware of system memory 175. Asset ID chip 177 is generally a hardware device, typically in the form of a discrete integrated circuit chip that is uniquely associated with the particular system planar on which it is mounted. Specifically, asset ID chip 177 is preferably a device that tracks and stores the identification and mutual configuration parameters of the hardware components such as processor 4, hard disk drive 20, hardware memory components, etc., which are communicatively mounted on the system planar. In its conventional role, asset ID chip 177 includes software and hardware modules and components that permit identification of configuration and components within data processing system 170 from an external reader device (not depicted).

The present invention advantageously employs the hardware tracking and system specific feature of asset ID chip 177 by pre-storing a unique system identifier code and an encrypted hash of the identifier code within asset ID chip 177. More specifically, and as depicted in FIG. 6, a system-specific serial number 182 is pre-stored in a non-volatile and non-erasable memory device 178 (e.g. non-erasable and non-writable read-only memory) within asset ID chip 177 together with a private-key encrypted hash 184 of the same serial number. As explained in further detail below with reference to FIG. 7, system authentication module 162 utilizes the stored serial number 182 and the encrypted hash 184 to authenticate the system planar.

A protected pre-load system authentication process in accordance with the present invention is now described with reference to FIG. 7 in conjunction with FIG. 6. The pre-load authentication process begins as shown at step 192 and proceeds to step 194 with system-specific serial number 182 being stored in non-volatile memory 178 of asset ID chip 177. A variety of well-known integrated circuit (IC) manufacturing processing devices may be used to implement a "burn-in" process by which such storage is accomplished. Using similar burn-in processing means in conjunction with a private key encryption mechanism, a private key encrypted hash 184 of the same serial number is also pre-stored within non-volatile memory 178 as shown at step 196. The pre-load installation sub-process begins as illustrated at step 198 with pre-load installation disk containing installation programs 159 and a system authentication module 162. During the initialization phase of the installation procedure, system authentication module 162 is loaded together with or as part of installation programs 159 into system memory 175. System authentication commences with system authentication module 162 utilizing a one-way hash algorithm to generate a hash of system serial number 182 (step 202). Authentication module 162 also includes instructions and a public key decryption algorithm for decrypting the private key encrypted serial number hash 184 (step 204).

Next, as illustrated at step 206, authentication module 162 compares the pre-load process generated serial number hash (not depicted) with the decrypted serial number hash (not depicted) to determine digital signature validity as shown at step 208. If, as depicted at step 210, the newly generated hash matches the decrypted hash, authentication module 162 branches or issues an instruction or command to installation programs 159 to continue installing operating system files 14 to hard disk drive 20. Otherwise, as shown at step 212, the compared strings do not match, authentication module 162 instructs the installation programs 159 to terminate the installation and the process ends at step 214.

In a further advantageous feature of the system and process depicted in FIGS. 6 and 7, the system serial number 182 may be recorded by the chip manufacturer and utilized to provide a permanent tracking identifier by which the manufacturer of the system hardware and/or pre-loaded software can determine whether additional, unauthorized systems have been assembled. Specifically, a record of the system serial numbers, such as serial number 182, may be maintained in an inventory tracking system (not depicted). The tracking entity (preferably the hardware system board manufacturer) may implement a hardware tracking control process whereby the number of Asset ID chips provided to a second "system manufacturer" (i.e., manufacturer that assembles/packages the full systems by installing the Asset ID chips and other system hardware and installing pre-load software) is recorded in association with the stored Asset ID chip serial numbers. The number of Asset ID chips provided to the system manufacturer may be compared with the number of system boards (e.g. motherboards) delivered to the system manufacturer to detect whether the software preloads are being installed on additional unauthorized systems.

While the invention has been particularly shown and described with reference to a preferred embodiment, it will be understood by those skilled in the art that various changes in form and detail may be made therein without departing from the spirit and scope of the invention.

What is claimed is:

1. A method for authenticating a software program previously installed in a direct access storage device within a data processing system, said method comprising:
    providing a hardware inventory device within said data processing system;
    storing in a non-erasable memory located within said hardware inventory device an unique identifier code (UIC) that uniquely identifies said data processing system;
    storing in said non-erasable memory of said hardware inventory device an encrypted hash, wherein said encrypted hash is generated by combining said UIC and a basis input/output system (BIOS) hash; and
    in response to a loading of a software program previously installed within a direct access storage device of said data processing system:
        obtaining said encrypted hash from said non-erasable memory of said hardware inventory device;
        decrypting said encrypted hash; and
        generating a new hash by using said UIC and a BIOS from said data processing system;
        comparing said decrypted hash with said new hash; and
        allowing said software program loading to continue when said decrypted hash matches said new hash.

2. The method of claim 1, wherein said method further includes disallowing said software program loading to continue when said decrypted hash does not match said new hash.

3. The method of claim 1, wherein said hardware inventory device is an Asset Identification chip mounted onto a system planar of said data processing system.

4. The method of claim 1, wherein said method further includes recording an identifier code in a hardware inventory tracking system.

5. A computer readable medium having a computer program product for authenticating a software program previously installed in a direct access storage device within a data processing system, said computer readable medium comprising:
    computer program code for storing in a non-erasable memory located within a hardware inventory device an unique identifier code (UIC) that uniquely identifies a data processing system;
    computer program code for storing in said non-erasable memory of said hardware inventory device an encrypted hash, wherein said encrypted hash is generated by combining said UIC and a basis input/output system (BIOS) hash; and
    in response to a loading of a software program previously installed within a direct access storage device of said data processing system:
        computer program code for obtaining said encrypted hash from said non-erasable memory of said hardware inventory device;
        computer program code for decrypting said encrypted hash; and
        computer program code for generating a new hash by using said UIC and a BIOS from said data processing system;
        computer program code for comparing said decrypted hash with said new hash; and
        computer program code for allowing said software program loading to continue when said decrypted hash matches said new hash.

6. The computer readable medium of claim 5, wherein said computer readable medium further includes computer program code for disallowing said software program loading to continue when said decrypted hash does not match said new hash.

7. The computer readable medium of claim 5, wherein said hardware inventory device is an Asset Identification chip mounted onto a system planar of said data processing system.

8. The computer readable medium of claim 5, wherein said computer readable medium further includes computer program code for recording an identifier code in a hardware inventory tracking system.

\* \* \* \* \*